INVENTORS
FRANZ GOTTFRIED REUTER
ULRICH NEHSE

ATTORNEYS

__United States Patent Office__ 3,011,197
Patented Dec. 5, 1961

3,011,197
PIPELINE CLEANING DEVICES
Ulrich Nehse, Roggenberg, Barnstorf, Hannover, and Franz Gottfried Reuter, Lemforde, Hannover, Germany, assignors, by mesne assignments, to Mobay Chemical Company, Pittsburgh, Pa., a corporation of Delaware
Filed July 18, 1958, Ser. No. 749,535
Claims priority, application Germany July 18, 1957
3 Claims. (Cl. 15—104.06)

This invention relates generally to internal cleaning devices for pipelines and, more particularly, to pipeline cleaning devices for use in the petroleum industry to remove paraffin deposits and other residues from the interior of a pipe. The cleaning devices are conveyed through the pipeline by the stream of fluid being transmitted.

It has been proposed heretofore to provide pipeline cleaning devices. These devices are usually constructed of a relatively inflexible body member usually of metal and having rubber discs thereround. However, these devices have as a serious disadvantage a tendency to seize in pipe bends where the deposits of residue are usually worse. These devices can then only be removed by cutting a section from the pipe. Other cleaning devices have been proposed heretofore which are cast from a composition containing paraffin, asphalt, crude oil, and the like together with a binding agent. These devices, however, are subject to wear and have only a limited service life.

It is, therefore, an object of this invention to provide a flexible pipeline cleaning device which will assure good cleaning action and also be able to pass over immovable obstacles and through pipe bends without difficulty as a result of its flexibility.

Another object is to provide a pipeline cleaning device with a long service life even though in constant daily use.

A further object is to provide a flexible pipeline cleaning device which can be removed in the event it seizes in the line by melting through the application of exterior heat.

Still another object of the present invention is to provide a composite flexible pipeline cleaning device having a tough but flexible exterior and a resilient flexible cellular core.

Yet another object of the present invention is to provide a flexible pipeline cleaning device having a tough resilient surface layer, an interior layer of resilient flexible cellular material, and a hollow core into which air may be compressed.

Other objects will become apparent with the following detailed description of the invention with reference to the accompanying drawings in which.

Figure 1:
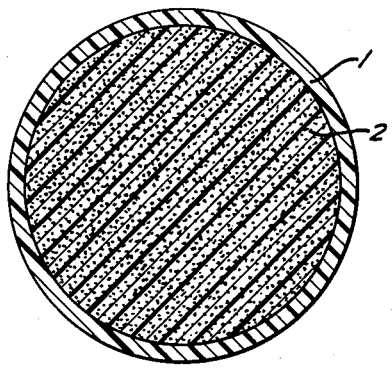
FIGURE 1 is a cross-sectional view of one pipeline cleaning device.

The above objects and others are accomplished in accordance with this invention, generally speaking, by providing a flexible cleaning device the exterior layer of which is constructed from a flexible synthetic material, preferably a homogeneous rubber-like polyurethane. Any suitable substantially nonporous rubber-like polyurethane may be used to mold or cast the cleaning device provided by this invention but best results are obtained when the polyurethane has a Shore A hardness of from about 30° to about 70° and an elasticity of from about 40% to about 80%.

The exterior rubber-like surface layer of the pipeline cleaning device provided by this invention may be formed from any suitable substantially nonporous or homogeneous rubber-like polyurethane. For instances, the polyurethane may be prepared by reacting any suitable organic polyisocyanate with any suitable organic compound having reactive hydrogens and capable of reacting with the polyisocyanate to form a polyurethane. For example, 1,5-naphthylene diisocyanate, p-phenylene diisocyanate or 4,4'-diphenyl dimethylmethane diisocyanate may be reacted with a polyester, polyalkylene ether glycol, a polythioether glycol or the like having terminal groups which are predominantly hydroxyl groups and a molecular weight of at least 750 and the resulting product may be cross-linked with an organic chain extender or cross-linker. Suitable cross-linking agents include ethylene glycol, diethylene glycol, butanediol, diprimary aliphatic and aromatic diamines, such as toluylene diamine, or the like. Indeed, any organic compound having reactive hydrogen atoms, organic polyisocyanate and cross-linker disclosed in U.S. Patents 2,729,618; 2,621,166; and 2,620,516 may be used in forming the polyurethane and any of the processes disclosed in these patents may be followed in making a polyurethane suitable for this invention.

The flexibility of the surface layer may be increased through the addition, during the manufacturing process, of activators, such as, for example, an alkali metal salt of an organic fatty acid or an aryl sulphonate, alkyl sulphonate, or aryl alkyl sulphonate, respectively. Examples of alkali metal salts of organic fatty acids are sodium oleate, potassium oleate, sodium stearate, potassium stearate, lithium linoleate, and the like. Examples of suitable sulphonates include dioctyl sodium sulphonate and isopropyl naphthaline sodium sulphonate. An important advantage of the nonporous rubber-like polyurethane as a material consists in the fact that in the molten stage it can be cast or molded into any desired form.

The friction characteristics of the tough but resilient surface layer may be improved by the addition to the polyurethane melt of lubricating agents, such as, silicone oil, hydrocarbons, and molybdenum disulfide. Each of these lubricating agents may be added in quantities of from about 0.01% to about 5% by weight, and preferably from about 0.1% to about 1% by weight, based on the weight of the cured rubber-like polyurethane plastic.

Any suitable hydrocarbon may be utilized, such as, for example, high boiling petroleum fractions including kerosene and conventional lubricating oils and waxes including paraffin, beeswax, ceresin, and the like.

The molybdenum disulfide should preferably be of a high technical grade and of high purity. Methods for preparing substantial pure molybdenum disulfide are disclosed in U.S. Patents 2,367,946 and 2,686,156. The products of the methods disclosed in these patents are particularly well suited for use in this invention.

Any suitable liquid organo-polysiloxane may be used as the silicone oil, provided the viscosity thereof is from about 50 to about 500 centistokes at 20° C. Examples of suitable silicone oils include dimethylsiloxane polymers having a viscosity of about 50 centistokes at 20° C., dimethylsiloxane polymers having a viscosity of about 140 centistokes at 20° C., and dimethylsiloxane polymers having a viscosity of 440 centistokes at 20° C., and mixtures thereof.

It has been found that bearing surfaces of rubber-like polyurethane plastics having molybdenum disulfide, hydrocarbons, and silicone oil incorporated therein display an extraordinarily low coefficient of friction. For example the coefficient of friction between the rubber-like polyurethanes and steel is about 0.1.

The cellular flexible interior of the pipeline cleaning device provided by this invention may be formed from any suitable flexible cellular material, such as, foam rubber and polyurethane foam. However, a particularly suitable flexible cellular material is polyurethane foam having a density of from about 1.5 to about 20 pounds per cubic foot, and, for best results, having an elasticity of from about 40% to about 80%. In order to provide such detail with respect to the specific starting materials, process, and apparatus that are especially useful to make polyurethane foam and, at the same time, achieve a certain degree of brevity herein, reference is made to U.S. Patent 2,764,565, issued to Hoppe et al. on September 25, 1956.

Referring again to the drawings for a more detailed description of the several embodiments.

FIGURE 1 illustrates one embodiment comprising a soft flexible homogeneous polyurethane surface layer 1, and a cellular flexible and resilient polyurethane core 2, having a density of about 3 pounds per cubic foot.

Figure 2:
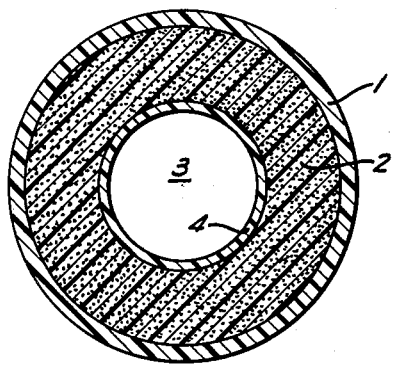
FIGURE 2 is a cross-sectional view of another pipeline cleaning device.

FIGURE 2 illustrates still another embodiment, wherein an air chamber 3 is provided in the interior of the polyurethane foam core 2. In this instance, it is often desirable to provide means for separating the air chamber 3 from the polyurethane foam core 2 by means of a homogeneous wall layer 4 similar to the surface layer 1.

Figure 3:
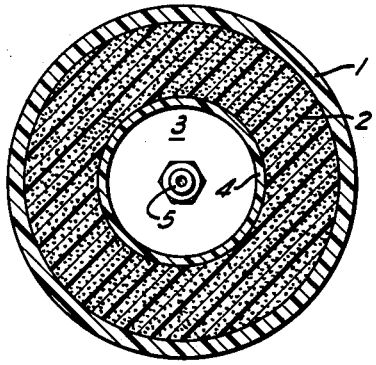
FIGURE 3 is a cross-sectional view of an embodiment of the invention.

FIGURE 3 illustrates an embodiment of the present invention in which the air chamber 3 is provided with a valve 5 for inflating the cleaning device and to obtain the desired wall pressure to achieve both a good cleaning effect and to prevent fluid from passing between the pipe walls and the device.

Figure 4:
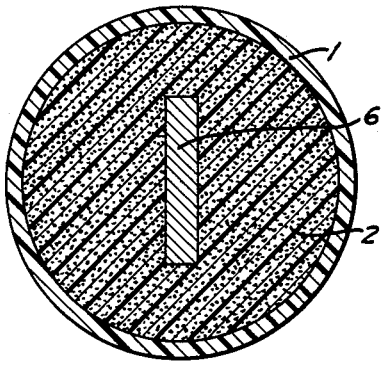
FIGURE 4 is a cross-sectional view of a further pipeline cleaning device.

The embodiment of FIGURE 4 illustrates a permanent magnet 6 of conventional construction, such as, for instance, of aluminum steel, in the interior of the cleaning device in order to control or follow the movement of the device through a pipe line.

It is to be understood from the foregoing that the cleaning device provided by this invention may be of any suitable length in relation to its diameter or cross-section and that the cross-section, if desired, may be other than circular. It is also to be understood that the foam core may be dispensed with if found desirable so that the interior of the cleaning device is one relatively large air chamber.

The following example illustrates the preparation of one polyurethane suitable for forming the soft flexible surface layer of the pipeline cleaning device provided by this invention:

*Example 1*

1,000 parts by weight of an hydroxyl polyester obtained by thermal esterification of about 11 mols of adipic acid with about 12 mols of ethylene glycol and having an hydroxyl number of about 52 and an acid number of about 1 are heated to a temperature of about 135° C. and under a vacuum of about 12 mm. until the formation of bubbles has stopped and the polyester is completely free from water. Now, 180 parts by weight of naphthylene-1,5-diisocyanate are added at 135° C. to the dehydrated polyester while stirring. As soon as the temperature starts to drop, 20 parts by weight of butylene glycol-1,4 are stirred into the mixture at about 135° C. The resulting mixture is poured into a suitable mold. This has been so designed that the foam core may be inserted in the mold in properly alined relation and the polyurethane is cast thereabout and solidified by curing. The above mixture is maintained in the mold at a temperature of about 110° C. for about 24 hours to form a homogeneous polyurethane rubber. After 24 hours the cleaning device is removed from the heating chamber and the surface layer then shows the following properties: The Shore A hardness 80°, resiliency 50%, elongation 600%.

It is to be understood that any suitable organic polyisocyanate, organic compound having reactive hydrogen atoms and cross-linking agent may be substituted for those in the foregoing example. Examples of these materials suitable for this purpose are found in the aforesaid patents. Moreover, it is to be understood that variations are permissible in the temperatures and processing steps insolong as the product obtained has the required physical characteristics.

As indicated hereinbefore, the molecular weight of the organic compound having reactive hydrogen atoms which is reacted with the organic polyisocyanate in the preparation of the polyurethane should be at least about 750. Although the chemistry involved in the preparation of the polyurethane is not specifically involved in this invention because any polyurethane having the required physical characteristics may be used, it is considered advisable to point out that the polyester may be prepared by esterification of any suitable polycarboxylic acid, such as, for example, adipic acid, succinic acid, and the like. A desirable polyalkylene ether glycol may be prepared by the condensation of a lower alkenyl oxide, such as, for example, ethylene oxide, propylene oxide, butylene oxide, and the like.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A flexible cleaning device for a pipeline comprising an outer layer of flexible homogeneous polyurethane plastic, an inner layer of flexible homogeneous polyurethane plastic defining a centrally disposed air chamber, said layers of homogeneous polyurethane plastic having a Shore A hardness of from about 30° to about 70° and an elasticity of from about 40% to about 80%, to flexible cellular polyurethane plastic disposed between said inner layer and said outer layer of homogeneous polyurethane plastic, said cellular polyurethane plastic having a density of from about 1.5 to about 20 pounds per cubic foot and an elasticity of from about 40% to about 80% and a means for inflating said air chamber.

2. A flexible cleaning device according to claim 1, wherein said outer layer of homogeneous polyurethane plastic contains a lubricating agent additive.

3. A flexible cleaning device according to claim 1, wherein said outer layer of homogeneous polyurethane plastic contains from about 0.01% to about 5% by weight of molybdenum disulfide.

References Cited in the file of this patent

UNITED STATES PATENTS

| | | |
|---|---|---|
| 567,459 | Elwell | Sept. 8, 1896 |
| 2,095,823 | Marshall | Oct. 12, 1937 |
| 2,258,174 | Chawner | Oct. 7, 1941 |
| 2,330,563 | Duval | Sept. 28, 1943 |
| 2,558,977 | Pearson | July 3, 1951 |
| 2,705,419 | Chawner | Apr. 5, 1955 |
| 2,906,650 | Wheaton | Sept. 29, 1959 |

FOREIGN PATENTS

| | | |
|---|---|---|
| 298,759 | Great Britain | Oct. 18, 1929 |
| 716,422 | Great Britain | Oct. 6, 1954 |

OTHER REFERENCES

Modern Plastics, vol. 32, No. 12 (August 1955), pp. 102–104.